Dec. 26, 1944. T. STENFORS 2,365,913
TYPEWRITER PROVIDED WITH TYPE-WHEEL OR TYPE-ROLLER
Filed Nov. 29, 1940 5 Sheets-Sheet 2
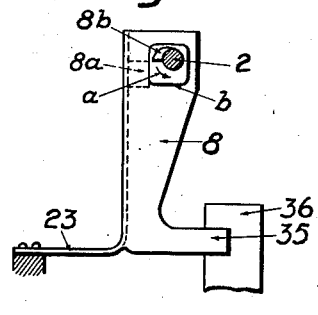
Fig. 2.
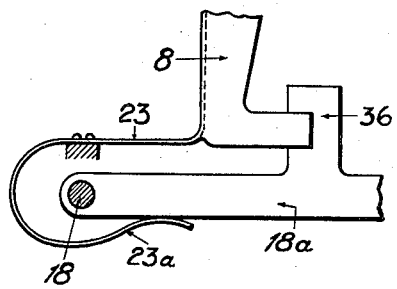
Fig. 2.a.
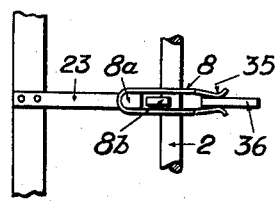
Fig. 4.
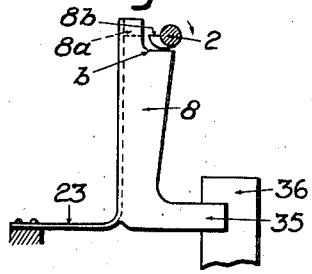
Fig. 3.
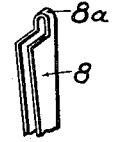
Fig. 3.a.
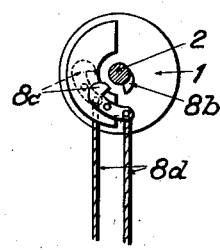
Fig. 5.
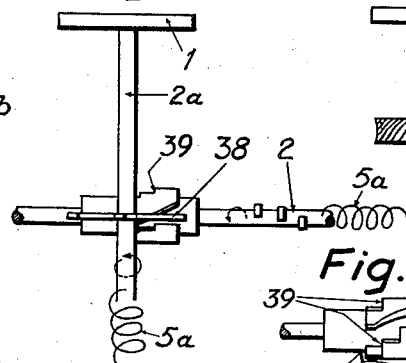
Fig. 7. Fig. 7.a.
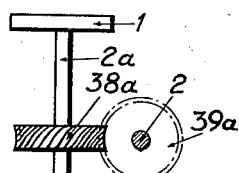
Fig. 8.
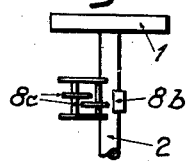
Fig. 6.
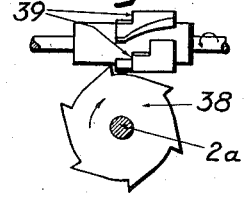
Inventor;
T. Stenfors
By: Glascock Downing & Seebold
Attys.

Dec. 26, 1944.    T. STENFORS    2,365,913
TYPEWRITER PROVIDED WITH TYPE-WHEEL OR TYPE-ROLLER
Filed Nov. 29, 1940    5 Sheets-Sheet 3
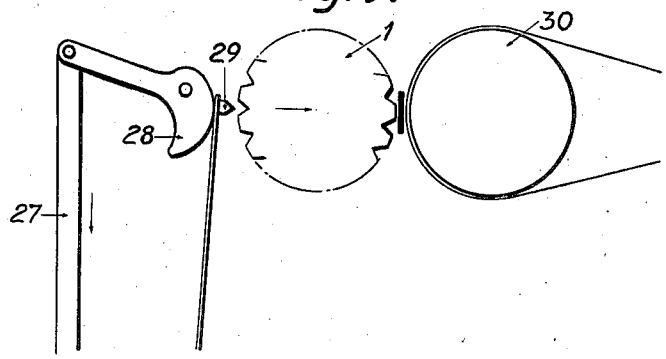
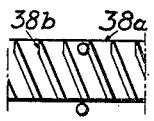
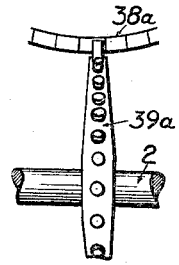
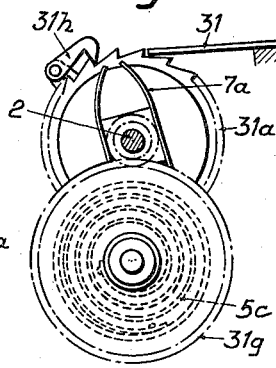
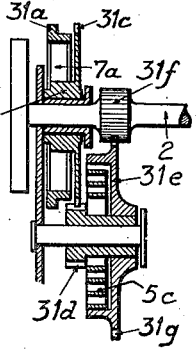
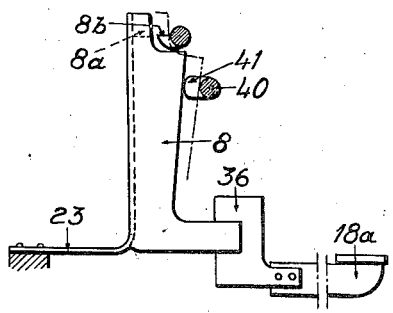
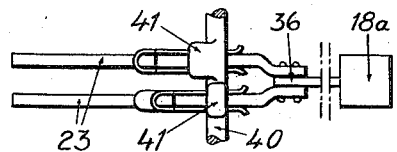
Inventor,
T. Stenfors
By: Glascock Downing & Seebold
Attys.

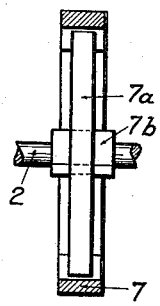
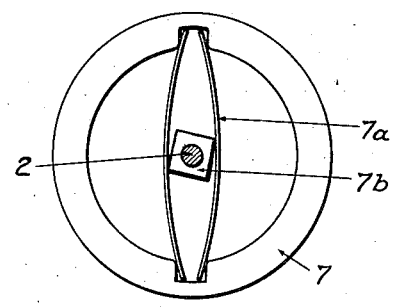
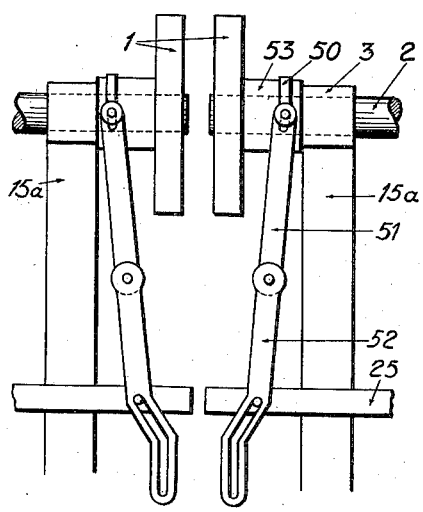
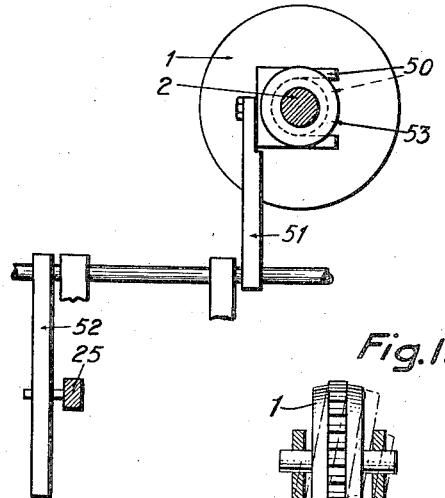
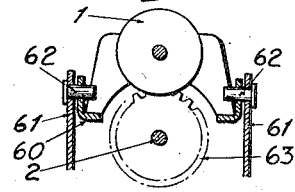
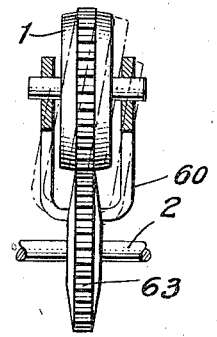

Dec. 26, 1944.  T. STENFORS  2,365,913
TYPEWRITER PROVIDED WITH TYPE-WHEEL OR TYPE-ROLLER
Filed Nov. 29, 1940   5 Sheets-Sheet 5
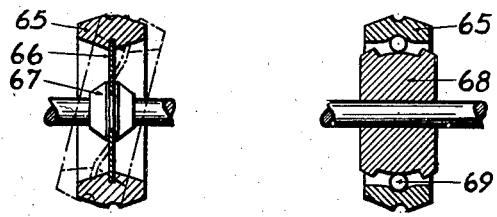
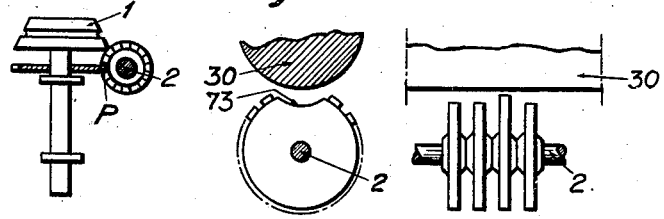
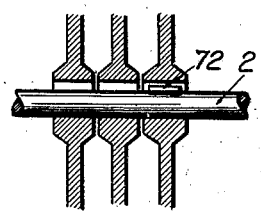
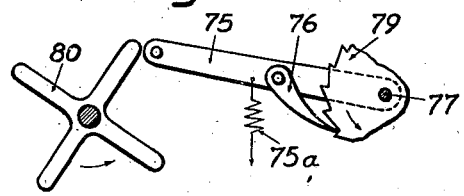
Inventor,
T. Stenfors
By: Glascock Downing Seebold
Attys.

Patented Dec. 26, 1944

2,365,913

UNITED STATES PATENT OFFICE 2,365,913

TYPEWRITER PROVIDED WITH TYPE WHEEL OR TYPE ROLLER

Tor Stenfors, Djursholm, Sweden

Application November 29, 1940, Serial No. 367,843
In Sweden November 30, 1939

3 Claims. (Cl. 197—18)

Typewriters working with type-wheel or type-roller belong to the oldest typewriter constructions and several proposals were produced, which were based on this primary type, to replace the hand writing by machine writing. Gradually the constructors went over to the type-arm machines which were improved more and more and which now, as is well known, have become very popular and are an international article.

However, the first-mentioned constructions have an important advantage over the last-mentioned ones because alphabet and other characters may be easily replaced. As is known, this takes place quite simply by replacing the type-wheel or the type-roller. These elements are not very expensive, and thus the machine can be changed at a low cost so that writing may take place with any characters. For example, it may be changed from Latin characters to German ones, from the Russian alphabet to the Greek alphabet, from physical and mathematical signs respectively to chemical signs and so on.

However, in later years these typewriters have been used particularly for writing on utilizing electrical impulses in so-called tele-typewriters and also for common machine writing. Yet these machines are characterized by a rather complicated construction, and their operation is all but noiseless.

The present invention relates to said typewriters working with type-wheel or type-roller. The object of the invention is to obtain a very great simplification of the construction, a reduction of space, a noiseless operation and a rapid writing. It may be mentioned as a very important advantage that all elements having the same function are equal which facilitates and cheapens mass production and, also to a very great extent, adjustment and change of elements, for example at repair and so on.

The invention comprises a plurality of means intended to cooperate with one another in the machine to obtain the above-mentioned objects. The sustaining principle of the invention may be briefly expressed in the following manner: The type-wheel is to be revolved, and possibly also displaced in the axial direction, by a permanently releasable force (a tensioned spring, a lever loaded by a weight, a weight only or the like), the motion being stopped in the positions corresponding to the characters by a catch device actuated by finger-keys or other actuating device.

To illustrate said principle and other features of the invention reference is made to the accompanying drawings, in which:

Figs. 2, 2a, 3 and 3a are side elevations of different embodiments of the catch device, while Fig. 4 shows the elements in Fig. 2 from above.

Figs. 5 and 6 show another embodiment of the catch device viewed in the same way as in Figs. 2 and 4.

Figs. 7 and 8 show a modified detail in two projections perpendicular to one another.

Fig. 7a is a view similar to Fig. 7 of a further modification.

Figs. 8a and 8b are enlarged detailed views of a device shown in Fig. 7a.

Fig. 9 shows diagrammatically part of the printing device of the machine.

Fig. 10 is a side elevation and Fig. 11 an axial section of an embodiment of a driving device of the machine.

Figs. 12 and 13 are side and top views respectively of means to enable shifting of characters.

Fig. 14 is an axial section, and Fig. 15 is a side elevation of an example of a coupling.

Figs. 16 and 17 show projections, which are perpendicular to one another, of an embodiment of a device for changing type-wheels, and Figs. 18 to 25 show various embodiments of details which are drawn quite diagrammatically.

Figure 1:
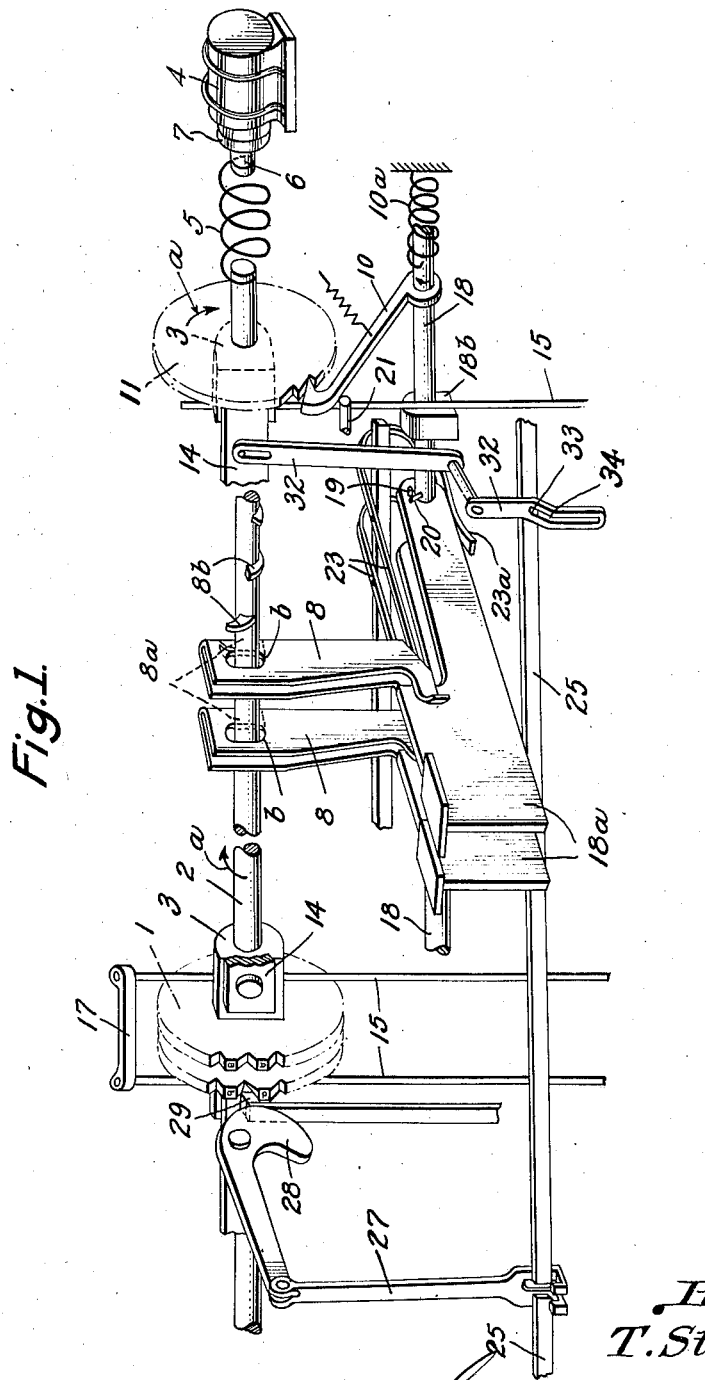
Fig. 1 is a diagrammatical perspective view of the main elements of a typewriter according to the invention.

In Fig. 1 the reference numeral 1 indicates a type-wheel, 2 its shaft, 3 the shaft bearings, 4 a driving motor, 5 a loading spring connected between the shaft 2 and an intermediate shaft 6 which is connected to the motor shaft by means of a coupling 7. The catching members are indicated by 8, and 10, 11 indicate a catching device the purpose of which will be seen from the following. 18a indicates finger-keys and 18 is a shaft on which they are mounted. A corresponding shaft bearing is indicated by 18b.

In the figure it is supposed that the type-wheel is so mounted that it can be displaced together with the shaft and the shaft bearings. Thus, the bearings 3 are shown supported by springs 15 which are fixed in their lower ends. One object of the resilience thus obtained is to enable the pressing of the characters against the paper, compare also Fig. 9. To reduce the mass and consequently the inertia of the type-wheel at the rotation the characters may be arranged on several wheels. The figure shows two wheels which are so arranged that there will be the same mechanism for both of the wheels. Consequently, each wheel has its individual shaft and its individual mechanism. For this reason the mechanism of one wheel only is shown. In this embodiment the mounting has for its purpose to make possible the alternation of the wheels necessary for the typing by displacing the shaft bearings axially. A rigid connection between the bearings of each shaft is embodied by a bar 14. By a hinge connection 17 the two supporting means exemplified by the bearings 3, the bars 14 and the springs 15 may be displaced together in the axial direction, but individually in the transverse direction.

In the figure the two type-wheels are shown to always revolve in the same direction, which simplifies the construction and also facilitates the illustration of the invention. The direction of revolution is marked by the arrow a. However, the invention is not restricted to this embodiment. The motor holds the spring 5 permanently tensioned, but the coupling 7, which makes possible a relative motion (slip) between the motor shaft and the intermediate shaft 6, provides for the proper tension of the spring.

The type-wheel is held in its position of rest by a stopping device which is exemplified by the two members 10 and 11. The ratchet wheel 11 is fixed to the shaft 2 and the pawl 10 is mounted on the shaft 18 of the finger-keys so that it can be turned on the shaft with a certain friction. When an arbitrary key is depressed the shaft 18 is first carried along for example by a pin 19 on the key and by a pin 20 on the shaft. The pawl 10 now releases the ratchet wheel. Having only just been disengaged the pawl is stopped by a member 21. Upon further depression of the finger-key the shaft is turned in the hub of the pawl.

The catching members 8—for the sake of simplicity only two of them are shown—are supposed to be of sheet metal which is bent to the shape of a U and provided with an opening for the shaft 2 and with a stop 8a fixed between the legs of the U. A projection 8b on the shaft corresponds to said stop. Each of the catching members is fixed to the frame of the machine by its individual element 23 which is shown resilient. Due to said element the respective catching member is easily movable in the transverse direction of the shaft 2. In the figure a catching member 8 and a projection 8b respectively are supposed to correspond to each type position of the wheel 1. When the finger-key is being depressed the stop 8a of the catching member will stand in the way of the projection 8b which moves in the direction of the arrow a. The ratchet wheel 11 is released and the projection 8b engages the catching member 8, said member being somewhat displaced so that one portion of the same is pressed against a point on the shaft located about 90° behind the projection (compare Fig. 2) whereby the shaft is being stopped. During the latter portion of the motion of the finger-key 18a the latter has moved the bar 25 downwards whereby the supporting means 3, 14, 15 and 17 by actuation of the bar via levers 32 or the like in Fig. 1 pushes the wheel 1 in front of the printing position whereafter the bar via the link 27 and the cam member 28 causes a centering member 29 to engage the type-wheel 1 so that the latter first is locked and then, by the force thus applied, is pressed against the ribbon and the paper, the roller 30 in Fig. 9 serving as support. To insure the parallel displacement of the shaft 2 it might be suitable to simultaneously apply the force to the shaft also in another point, for example at the right bearing 3. By a suitable slot and key connection 33 and 34 between the bar 25 and the levers 32 and the link 27 respectively it is possible to obtain a suitable sequence between the radial and axial motion of the typewheel. Due to a certain resilience in the fixing points of the catching member 8 at 35 the stops 8a do not prevent the axial motion of the shaft 2.

When the finger-key ascends again the elements are successively brought to the initial positions whereby due to the friction against the shaft 18 the pawl 10 engages the ratchet wheel 11 again before the catching member 8 has released the projection 8b or before the centering member 29 has released the type-wheel. According to the angular positions of the projections 8b relatively to the shaft 2 said shaft will be rotated a larger or smaller angle in its bearings whereby thus during the rotation of the shaft different characters will be brought to the desired position always in the same direction.

In Figs. 1 and 2a the spring 23 connected with the respective catching member is shown elongated and bent in under the key-lever with a portion 23a for supporting the finger-key.

The catching member in Fig. 3 differs from that shown in Figs. 2 and 4 inasmuch as the projection 8b strikes from below against the stop 8a, i. e. the use of this catching member necessarily entails that the shaft 2 rotates in a direction opposite to that described. Fig. 3a shows a simplified embodiment. The sheet metal piece is shown bent as a hairpin.

The catching members 8, see Figs. 2, 3, 4, are supposed to be provided with resilient arms 35 engaging a member 36 fixed to the finger-key so that already upon a slight depression of the key the catching device is brought to the engaging position whereafter at continued depression of the key the resilient arms glide on the abovementioned member 36 and thus retain the catching device in the engaging position so that through permanent pressure against the shaft it contributes to prevent rebound. Already at the beginning of the release of the key—for the sake of simplicity the force necessary for the return motion is illustrated by a spring 10a located on the shaft 18—the catching device is disengaged and the mutual initial position between the catching member 8 and the finger-key 18a is restored due to the fact that the catching member strikes with the edge b of the opening against the shaft 2 or with any part against 14 while the key continues for a while.

The catching members 8 can be filled and/or coated with some material breaking the effect of vibrations, such as lead, asphalt, pitch and so on.

That portion of the catching members which is pressed against the shaft when the catching members are in the engaging position should be provided with a coating or the like of a material having a high coefficient of friction in order to moderate the effect of rebound.

Figs. 5 and 6 show pivotable pawls 8c instead of the stops 8a. These pawls may be arranged in steps on their respective shafts in order to be placed close to one another and for the purpose that several pawls shall be able to cooperate with the same projection 8b which then must have a sufficient length in the axial direction. At such an arrangement the projection 8b can glide along the respective pawl 8c at the displacement of the shaft. The pawls are connected with the finger-keys by means of wires 8d or the like.

The general rule is that after the type-wheel has been locked by the centering means the catching members, for example those indicated by 8, may be released because the type-wheel remains locked until the shaft 2 has returned to its position of rest.

Figs. 7 and 8 exemplify a gear device in the connection between the type-wheel 1 and the shaft 2, said device substantially consisting of a wheel 38 rigidly connected with the type-wheel by means of a special shaft 2a, said wheel 38 having teeth or hooks which rest against similar teeth 39 or other projections on the shaft 2, the type wheel being in the revolving direction actuated by a tensioned spring 5a which turns the type-wheel step by step when the shaft 2 is rotated.

The transmission device illustrated in Fig. 7a and, partially on a larger scale, in Figs. 8a and 8b corresponds to a certain extent to the device previously mentioned. The wheel 38a on the type-wheel shaft 2a is in mesh with a toothed wheel 39a located on the catch shaft 2 so that both function as a worm gear for transmitting driving power from the shaft 2 to the shaft 2a and for controlling and stopping the rotation of the type-wheel. The type-wheel may also be driven by a separate spring as in Fig. 7. As the teeth of the wheel 39a are wide apart and the teeth of the wheel 38a are bevelled at 38b (Fig. 8b) so that a surface parallel with the shaft 2 is formed on each tooth a reaction of the inertia of the type-wheel on the catching members is avoided understanding that tooth and bevel are opposite one another in the respective catching positions of the shaft 2.

The mechanism illustrated in Figs. 10 and 11 is a device by which the loading spring, here in the shape of a watch spring 5c, is tensioned by utilizing the radial movement of the type-wheel. The device consists of a stationary stop 31, a ratchet wheel 31a, a coupling 7 between said wheel and a toothed wheel 31c, a pinion 31d in mesh with said toothed wheel, said pinion tensioning the spring 5c located in the housing 31e, and a pinion 31f on the type-wheel shaft in mesh with a toothed wheel 31g located on the housing 31e. Each time the type-wheel is pushed to the printing position the wheel 31a is advanced one step, and by suitably selected gear ratios the spring 5c can be held properly tensioned irrespective of the larger or smaller angle of revolution of the type-wheel. A pawl 31h retains the wheel 31a in its position until the next printing.

Figs. 12 and 13 exemplify a shifting mechanism on using one and the same key for two or several catching members, for example to print a capital and a small letter by the same key. The figure shows two catching members arranged in this way. The mechanism substantially consists of a shaft 40 with a cam 41 for each catching member, said cams in a certain position of rotation of the shaft 40 preventing one or several catching members—in the example shown one of the catching members 8 at each key—from getting in the way of the projection 8b of the type-wheel shaft.

Figs. 14 and 15 show the coupling 7 on a larger scale. The twisting moment is transmitted to the shaft 2 by leaf springs 7a which are fixed in the wheel 7 and engage an untrue roller 7b on the shaft 2.

In Figs. 16 and 17 it is supposed that the type-wheels are axially displaceable on the shaft in order to be set in front of the printing position and that the type-wheels are carried along in the rotation of the shafts by means of a key or other connection. The bearings 3 are supported by leaf springs 15a or the like. By a slot and fork connection 50 between the levers 51, 52 and the hubs 53 of the type-wheels the necessary displacement motion can be obtained from the bars 25 in the manner disclosed in Fig. 16.

It might not be necessary to show how the type-wheels are mounted on their shafts in order to be substituted, this being a pure matter of construction.

Of course, the invention is not limited to the disclosed embodiments and details. Additionally, the following variations may be described.

In order to provide several rows of characters on the same wheel one may use a rockable type-wheel instead of an axially movable type-wheel, said wheel being mounted for example according to Figs. 18 and 19, or 20 and 21. According to the two firstmentioned figures the type-wheel is mounted on a short shaft in a special rockable holder 60. Its pivots, which are mounted in fixed supports 61, are indicated by 62. Between the rows of characters there are teeth in mesh with a toothed wheel 63 fixed to the catch shaft 2. If the whole mechanism is arranged in such a way that the axis of the rocking motion of the holder 60 goes through the point of engagement of the teeth the type-wheel may be rocked in the intended manner on retaining the mesh.

In Figs. 20 and 21 the characters are provided on a ring 65. In Fig. 20 this ring is shown fixed on a flexible plate 66 (spokes may alternately be used) fixed in a hub 67 on the driving shaft so that the ring can assume oblique positions as indicated in dot and dash lines in order to set the desired row of characters in the printing position. In Fig. 21 the ring is mounted on a hub 68 by means of balls 69 which make possible the oblique positioning of the ring. Each of the balls, however, is located in its individual countersink in ring and hub in order that the ring may be carried along at the rotation of the shaft.

Fig. 22 shows a type-wheel with several rows of characters in connection with the modification shown in Figs. 7 and 8. It is located close to the toothed wheel in the transmission, and its shaft is mounted in a holder which is rockable for selection of a row of characters. The point P constitutes the rocking center.

By arranging the characters in rows on the type-wheel an advantageous reduction of the moment of inertia of the wheel is obtained.

Shifting device with several type-wheels (for example with different alphabets) of equal size and shape may be used, the wheels being displaceably mounted on the shaft, for example according to Figs. 23, 23a, 23b, 23c, and 24. In front of the printing position there is a key 72 on the shaft 2, and the wheel to be used is moved into mesh therewith. All wheels have a recess 73 in the periphery, and all of the wheels, except the one being in mesh with the shaft, are set in such a way that the said recess will be in front of the paper roller 30 at the printing whereby they become inactive.

Fig. 25 shows a device for tensioning a loading spring only by elongating (or compressing) the same, thus without using a slipping coupling. A straight spring 75a is fixed in a lever 75 in such a way that in the tensioned condition the spring tends to swing the lever. When this occurs a pawl 76 advances a ratchet wheel 79 carried by a shaft 77. At each move of the characters the spring is tensioned by a spider 80 which can be rotated the required distance, in the supposed case 90° for each character, for example by the carriage of the typewriter. The arrangement of the transmission between the wheel 80 and the carriage is here left out, it being a pure matter of construction.

Having now described my invention, what I claim as new and desire to secure by Letters Patent is:

1. A typewriter comprising revolving type-wheel means, driving means for said type-wheel means, a catching device for stopping the type-wheel means in relation to the printing positions, said catching device including settable catching members and finger keys for setting the catching members, the catching members of said device being in frictional engagement with the keys in order to allow some motion of the keys in relation to the catching device.

2. A typewriter comprising two type-wheels, a drive shaft supporting each of said type-wheels, a support for a typing sheet, means supporting each shaft for movement in one direction to dispose the related typing wheel in position for printing and in another direction for effecting impression of the type of the related type-wheel on the typing sheet independent means for shifting the respective shafts and related type-wheels in the first direction into printing position, and means common to the several shafts for effecting a type impression movement of the type-wheel disposed in printing position.

3. In combination, a rotatable shaft, a settable catch member movable with relation to said shaft, an abutment on said catch member engageable with said shaft, a shoulder on said catch member, a projection rotatable with said shaft, and a finger key in sliding frictional engagement with said catch member for setting the latter and disposing the shoulder in position to be engaged and displaced by the rotating projection whereby said abutment is drawn against said shaft and through engagement of the projection with the shoulder, the rotary movement of the shaft is arrested, said sliding frictional engagement accommodating movement of said finger key relative to said catch member.

TOR STENFORS.